United States Patent
Ishikawa (10) Patent No.: US 7,724,901 B2
(45) Date of Patent: May 25, 2010

(54) IMAGE PROCESSING METHOD

(75) Inventor: Takashi Ishikawa, Hachioji (JP)

(73) Assignee: Olympus Corporation, Tokyo (JP)

( * ) Notice: Subject to any disclaimer, the term of this patent is extended or adjusted under 35 U.S.C. 154(b) by 1370 days.

(21) Appl. No.: 11/136,273

(22) Filed: May 24, 2005

(65) Prior Publication Data

US 2006/0001676 A1    Jan. 5, 2006

(30) Foreign Application Priority Data

Jun. 15, 2004    (JP)    ............................ 2004-176778

(51) Int. Cl.
  *H04N 7/167*    (2006.01)
(52) U.S. Cl. .................................... 380/210
(58) Field of Classification Search ........................ None
  See application file for complete search history.

(56) References Cited

U.S. PATENT DOCUMENTS

| | | | | |
|---|---|---|---|---|
| 5,819,289 | A * | 10/1998 | Sanford et al. ............ | 707/104.1 |
| 6,067,073 | A * | 5/2000 | Rae-Smith et al. .......... | 345/589 |
| 2002/0126312 | A1* | 9/2002 | Waksman ................... | 358/2.1 |
| 2003/0231770 | A1 | 12/2003 | Nishikawa | |
| 2004/0005093 | A1* | 1/2004 | Rhoads ....................... | 382/232 |

FOREIGN PATENT DOCUMENTS

| | | |
|---|---|---|
| CN | 1469313 | 1/2004 |
| JP | 05-103326 | 4/1993 |
| JP | 11-252498 | 9/1999 |

OTHER PUBLICATIONS

Chinese Office Action for Chinese Patent Application No. 200510077148.6, dated Mar. 30, 2007 (2 pgs. and 3 pgs.), with English language translation (3 pgs and 3 pgs.).

* cited by examiner

*Primary Examiner*—Pramila Parthasarathy
(74) *Attorney, Agent, or Firm*—Straub & Pokotylo; John C. Pokotylo (57) ABSTRACT

An image processing method includes inputting electronic image data to be scrambled, decomposing the input electronic image data into n colors (n is an integer) and producing m pieces of color decomposition data for each color (m is an integer), producing palette data in which each of the m pieces of color decomposition data is assigned a palette identification number, producing palette exchange data based on predetermined conditions, exchanging palette identification numbers of the color decomposition data based on the produced palette exchange data, and synthesizing the m pieces of color decomposition data whose palette identification numbers are exchanged, encoding the synthesized data, and outputting the encoded data as a piece of scrambled image data.

9 Claims, 6 Drawing Sheets

| (R0, G0, B0) | (R1, G1, B1) | (R2, G2, B2) | (R3, G3, B3) |
|---|---|---|---|
| (R4, G4, B4) | (R4, G4, B4) | (R5, G5, B5) | (R6, G6, B6) |
| (R4, G4, B4) | (R7, G7, B7) | (R8, G8, B8) | (R8, G8, B8) |
| (R9, G9, B9) | (R10, G10, B10) | (R11, G11, B11) | (R12, G12, B12) |

FIG. 3

| Unit number | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| R pixel value | R0 | R1 | R2 | R3 | R4 | R5 | R6 | R7 | R8 | R9 | R10 | R11 | R12 | R13 | EOP |
| G pixel value | G0 | G1 | G2 | G3 | G4 | G5 | G6 | G7 | G8 | G9 | G10 | G11 | G12 | G13 | EOP |
| B pixel value | B0 | B1 | B2 | B3 | B4 | B5 | B6 | B7 | B8 | B9 | B10 | B11 | B12 | B13 | EOP |

FIG. 4

| 0 | 1 | 2 | 3 |
|---|---|---|---|
| 4 | 4 | 5 | 6 |
| 4 | 7 | 8 | 8 |
| 9 | 10 | 11 | 12 |

Area 1

| Unit number | 0 | 1 | 2 | 3 | 4 | 5 | 6 | 7 | 8 | 9 | 10 | 11 | 12 | ... | 255 |
|---|---|---|---|---|---|---|---|---|---|---|---|---|---|---|---|
| R pixel value | 226 | 227 | 221 | 218 | 225 | 231 | 237 | 227 | 169 | 166 | 177 | 177 | 176 | ... | EOP |
| G pixel value | 137 | 135 | 138 | 130 | 128 | 143 | 143 | 127 | 63 | 73 | 75 | 75 | 78 | ... | EOP |
| B pixel value | 133 | 126 | 121 | 108 | 106 | 117 | 118 | 127 | 89 | 91 | 88 | 89 | 93 | ... | EOP |

Area 2

| Unit number | 0 | 1 | 2 | 3 | 4 | 5 | 6 | 7 | 8 | 9 | 10 | 11 | 12 | ... | 255 |
|---|---|---|---|---|---|---|---|---|---|---|---|---|---|---|---|
| R pixel value | 224 | 226 | 225 | 229 | 230 | 234 | 222 | 168 | 164 | 183 | 178 | 178 | 181 | ... | EOP |
| G pixel value | 130 | 129 | 125 | 141 | 145 | 138 | 103 | 56 | 69 | 75 | 70 | 68 | 78 | ... | EOP |
| B pixel value | 104 | 107 | 106 | 116 | 115 | 112 | 97 | 79 | 78 | 79 | 82 | 78 | 83 | ... | EOP |

Area d

| Unit number | 0 | 1 | 2 | 3 | 4 | 5 | 6 | 7 | 8 | 9 | 10 | 11 | 12 | ... | 255 |
|---|---|---|---|---|---|---|---|---|---|---|---|---|---|---|---|
| R pixel value | 228 | 231 | 232 | 228 | 229 | 225 | 170 | 166 | 180 | 175 | 177 | 182 | 194 | ... | EOP |
| G pixel value | 136 | 145 | 146 | 134 | 136 | 108 | 56 | 63 | 75 | 74 | 69 | 77 | 85 | ... | EOP |
| B pixel value | 115 | 113 | 111 | 109 | 106 | 83 | 75 | 81 | 79 | 77 | 78 | 85 | 84 | ... | EOP |

FIG. 9

IMAGE PROCESSING METHOD

CROSS-REFERENCE TO RELATED APPLICATIONS

This application is based upon and claims the benefit of priority from prior Japanese Patent Application No. 2004-176778, filed Jun. 15, 2004, the entire contents of which are incorporated herein by reference.

BACKGROUND OF THE INVENTION

1. Field of the Invention

The present invention relates to an image processing method.

2. Description of the Related Art

In recent years, as digital still cameras or the like have been widely used, personal users who handle digitized images and pictures have been increasing. Many of the images and pictures have been increasingly disclosed to the public through the Internet or intranets. In some cases, specific image data is distributed at charge to a person who wishes to buy the data, or to a specific user through a network site, which can be accessed by unspecified users. In such cases, generally, a password is set to obtain the image, or the image to be distributed is scrambled or mosaicked. To distribute a scrambled image, a transmitter side must have scrambling means, and a receiver side must have scramble releasing (descrambling) means. A scanning line signal switching method or a scanning line shifting method, utilizing random arrangement, are known as the image scrambling methods. In the former method, the order of data in a scanning line is changed. In the latter method, data is shifted from one scanning line to another. Further, Jpn. Pat. Appln. KOKAI Publication No. 5-103326 discloses a method for produce a scrambled image by forming new two field images from two field images in one frame so as not to reduce the compression ratio.

In the case where the password setting method is employed, it is necessary to use a password management server and collectively manage the access rights of all persons who wish to buy the image data on the server, although no hardware is required. In the case where the scramble distribution method is employed, both software and hardware load is required, although there is no need of managing the access rights.

Since the scrambling process in the transmitter side is performed independent of a compressing process, the following drawback occurs: if the scrambling process is performed after the compressing process, it is necessary to transmit data without an error in descrambling. On the other hand, if the compressing process is performed after the scrambling process, the compression is reduced due to the reduction of a correlation between adjacent pixels.

BRIEF SUMMARY OF THE INVENTION

An object of the present invention is to provide a scramble image processing method, which can easily realize scramble image processing only by adding a simple structure and suppress the reduction in compression ratio to a relatively small degree.

To achieve the above object, according to an aspect of the present invention, there is provided an image processing method for subjecting digital electronic image data to predetermined image processing, the method comprising: inputting electronic image data to be processed; decomposing the input electronic image data into n colors (n is an integer) and producing m pieces of color decomposition data for each color (m is an integer); producing palette data in which each of the m pieces of color decomposition data is assigned a palette identification number; producing palette exchange data based on predetermined conditions; exchanging palette identification numbers of the color decomposition data based on the produced palette exchange data; and synthesizing the m pieces of color decomposition data whose palette identification numbers are exchanged, encoding the synthesized data, and outputting the encoded data as a piece of scrambled image data.

According to another aspect of the present invention, a computer-readable recording medium storing a computer program for executing an image processing method, is provided.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

An embodiment of the present invention will be described with reference to the accompanying drawings.

Figure 1:
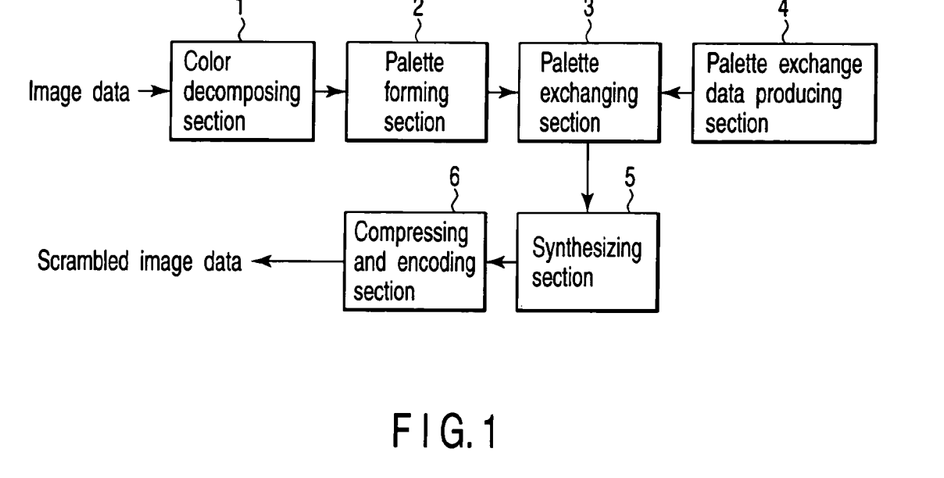
FIG. 1 is a block diagram showing a scrambling portion, which performs a scrambling process of an image processing method according to an embodiment of the present invention.
Figure 2:
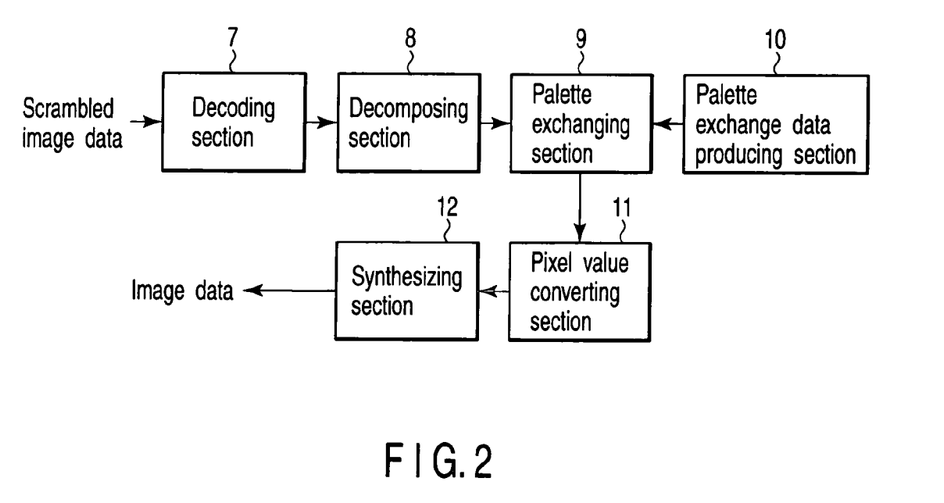
FIG. 2 is a block diagram showing a descrambling portion, which performs a descrambling process of the image processing method according to the embodiment of the present invention.

FIG. 1 shows a structure of a scrambling portion, which performs a scrambling process of an image processing method according to an embodiment of the present invention, and FIG. 2 shows a structure of a descrambling portion, which performs a descrambling process of the image processing method. Configurations and operations of these portions will be described in detail.

As shown in FIG. 1, the scrambling portion includes a color decomposing section 1, a palette forming section 2, a palette exchanging section 3, a palette exchange data producing section 4, a synthesizing section 5 and a compressing and encoding section 6.

In this configuration, when electronic image data to be scrambled is input to the color decomposing section 1, the color decomposing section 1 decompose the electronic image data (for example, about 170,000 colors in the case of a full-color image) into a predetermined numbers (n numbers: n is an integer, for example, 256 in this embodiment) for each of the color components.

In the color decomposition, each of the 256 colors is decomposed into areas (hereinafter referred to as units) and, for example, m pieces of color decomposition data for each color are produced (m is an integer). The palette forming section 2 forms a palette of the color decomposition data, which have been decomposed for each of the 256 colors. In general, in the case of a full-color image, a color is represented by R, G and B components. A palette represents a color by one value.

Figure 3:
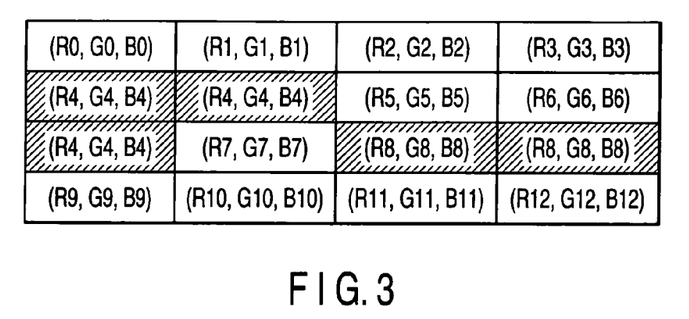
FIG. 3 is a diagram for explaining unitization of image data.
Figure 4:
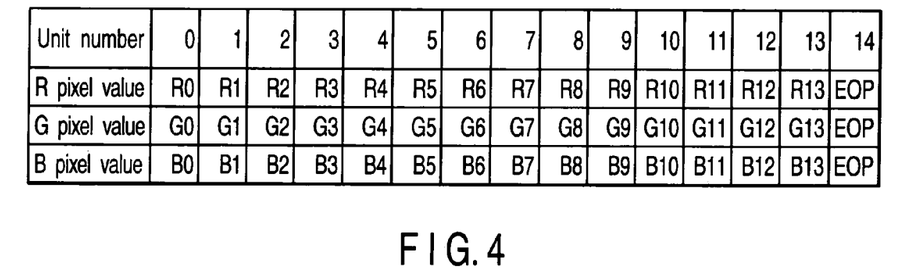
FIG. 4 is a diagram showing an example of palette data.

In the palette forming process described above, the palette forming section 2 produces palette data to which a unit symbol as an identification number is assigned. More specifically, image data is unitized as shown in FIG. 3, and the unit symbol of each unit is associated with RGB pixel values by the palette data shown in FIG. 4.

The symbol EOP assigned to the end of the unit means "End Of Palette". The end of the unit is recognized by this symbol.

Figure 5:
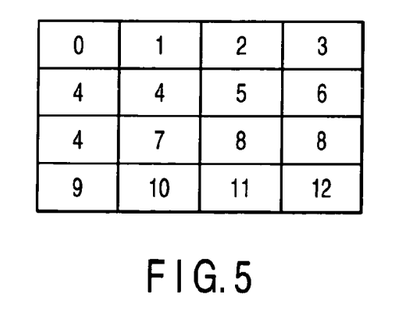
FIG. 5 is a diagram showing an example of unit data.

Thereafter, the palette exchanging section 3 exchanges palettes of the respective units, thereby carrying out the scrambling process. For example, if the palette forming section 2 defines a palette 1 for the area 1 and a palette 2 for the area 2, when the palettes of the respective units are exchanged, the original image data is scrambled at the time of exchange. At this time, the palette exchange data producing section 4 produces palette exchange data under predetermined conditions. As shown in FIG. 5, unit data represents a palette symbol corresponding to each unit.

The synthesizing section 5 synthesizes data, which have been separated for the respective units 1, 2, . . . . The compressing and encoding section 6 compresses and encodes the synthesized data. The compressing and encoding process is performed by means of a known method, such as DPCM (differential pulse code modulation) encoding.

The scrambling process is performed as described above. When the data is input to the compressing and encoding section 6, only the exchange of the palettes of the units has been performed. Therefore, the compression efficiency is reduced little. This is one of the advantages of the embodiment of the present invention.

The exchange of the palettes as described above is carried out by producing palette exchange data by means of a code. More specifically, the data for producing the palette exchange data may be obtained by inputting a password (a combination of several numbers or alphabets) by the user or a common or public key. The palette exchange data may be directly produced by a pseudo random number arithmetic processing based on the password or key data. If more highly scrambled data is required, palette exchange data, depending on an image, may be produced by referring to image data. The electronic image data can be scrambled by exchanging m palettes of the palette exchange data thus produced. Further, the number of palettes can be changed by changing the value of n, the degree of scrambling may be changed. The value of n may be fixed or suitably determined based on the total number of colors.

As shown in FIG. 2, the descrambling portion includes a decoding section 7, a decomposing section 8, a palette exchanging section 9, a palette exchange data producing section 10, a pixel value converting section 11 and a synthesizing section 12.

The electronic image data, which has been scrambled by the scrambling portion, is input to the decoding section 7. The scrambled image data has been compressed and encoded. The decoding section 7 decodes the compressed and encoded scrambled image data. The decomposing section 8 decomposes the decoded image data to m pieces of color decomposition data for each unit (m is an integer). The palette exchanging section 9 associates the palettes of the respective units with reference to the palette exchange data managed by the palette exchange data producing section 10. The pixel value converting section 11 converts the pixel value of the color decomposition data of each unit. The synthesizing section 12 synthesizes the color decomposition data of the respective units into a piece of electronic image data. Thus, the descrambling process can also be carried out only by associating the pallets corresponding to the respective units to the original palettes with reference to the palette exchange data. Therefore, the descrambling process can be simple and efficient.

Figure 6:
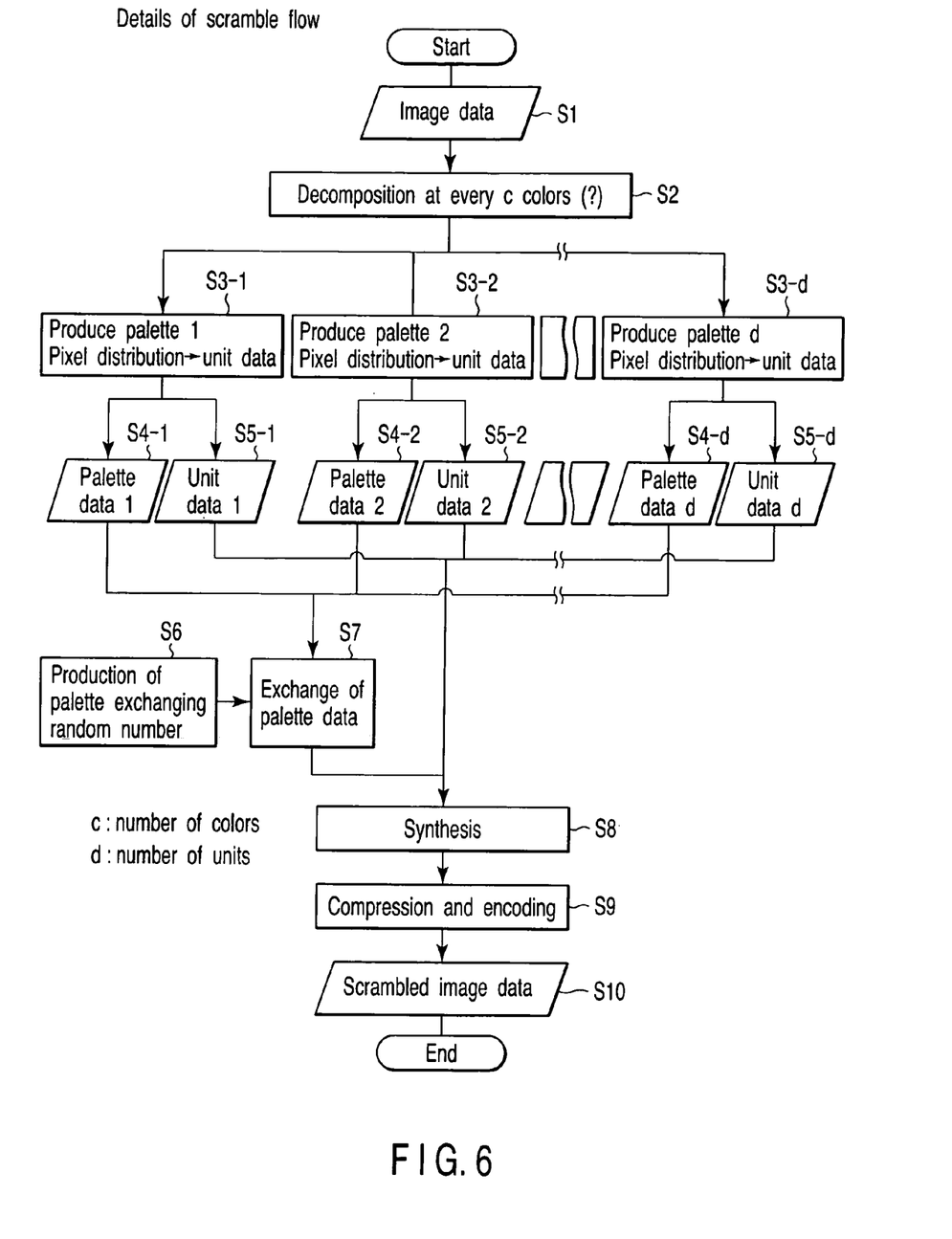
FIG. 6 is a flowchart for explaining details of the flow of the scrambling process according to the embodiment of the present invention.

The flow of the scrambling process of the image processing method according to the embodiment of the present invention will be described in detail with reference to the flowchart shown in FIG. 6.

In the following description, the configuration of the scrambling portion shown in FIG. 1 is referred to if necessary.

Figure 8:
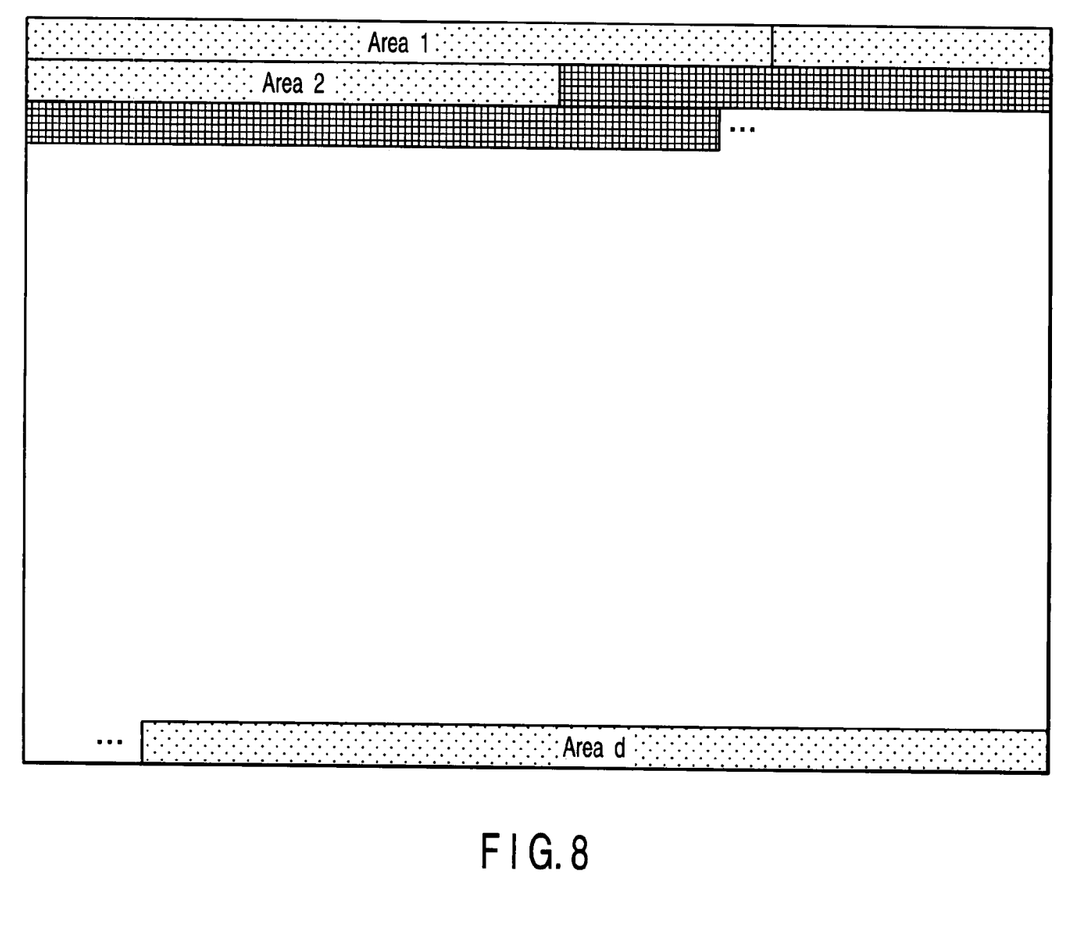
FIG. 8 is a schematic diagram showing unitized image data.

When electronic image data is input to the color decomposing section 1 (Step S1), the image data is decomposed at every c colors (c is an integer) (Step S2). In this embodiment, for example, as shown in FIG. 8, the image data is decomposed to the regions (hereinafter referred to as the units) 1, 2, . . . and d at every predetermined number of colors. The image data is sequentially scanned from the upper left portion of FIG. 8, and the combination of R, G and B of each pixel is checked. The size of a unit is determined by the number of colors. When the number of colors of the unit 1 reaches the predetermined value, the unit 2 starts.

Figure 9:
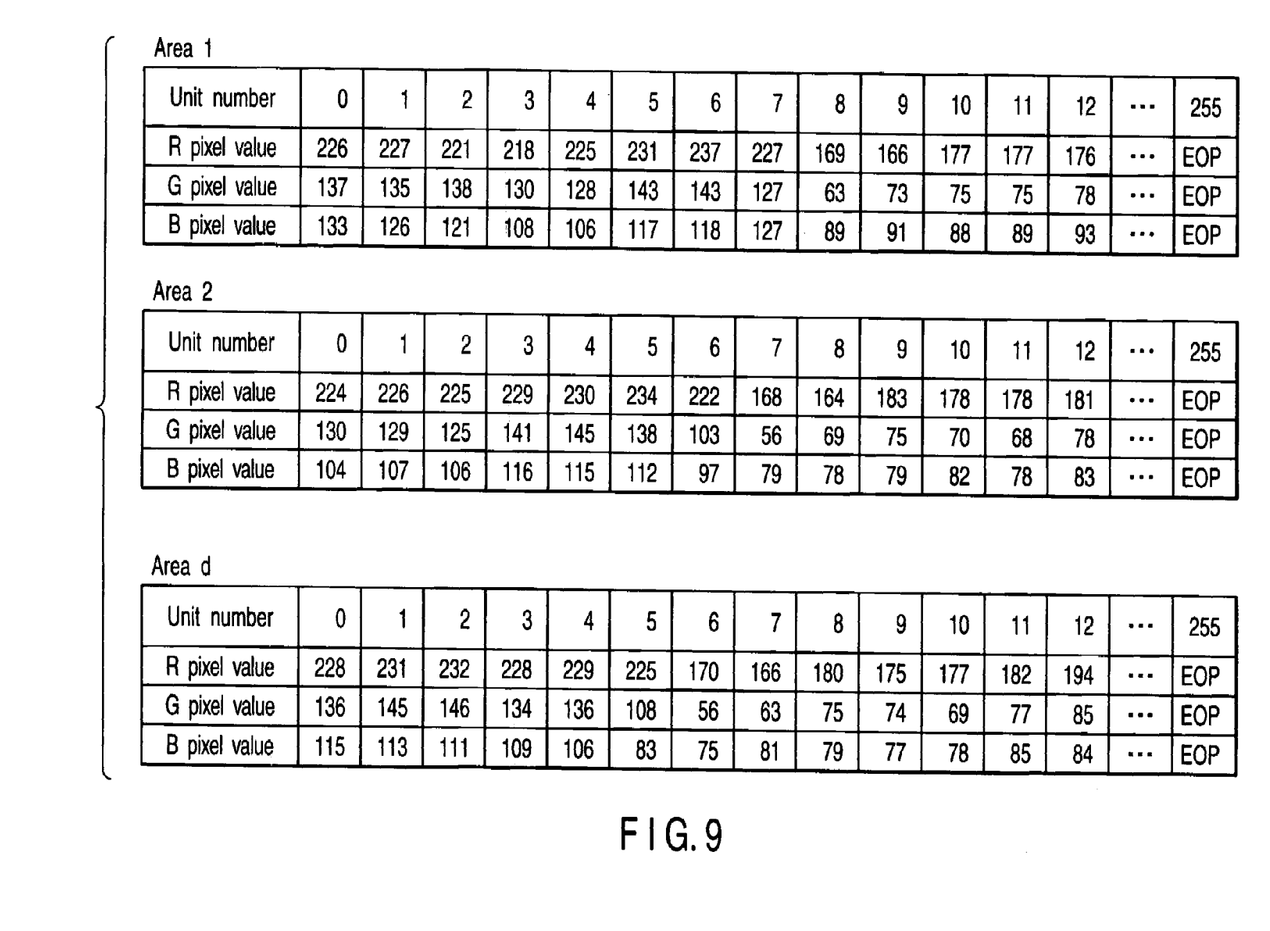
FIG. 9 is a diagram showing palette data in regions 1 to d.

Then, the palette forming section 2 produces palette data. More specifically, a unit symbol as an identification number is assigned to each unit, so that the palette data as shown in FIG. 9 is produced. The uppermost section in FIG. 9 represents the palette data of the unit 1, the middle section represents the palette data of the unit 2, and the lowermost section represents the palette data of the unit d (d is an integer).

More specifically, the palette data 1 to d are produced, and output in association with the unit data 1 to d (Steps S3-1, 3-2, . . . , 3-$d$, 4-1, 4-1, . . . , 4-$d$, 5-1, 5-2, . . . , 5-$d$).

Then, the palette exchanging section 3 exchanges palette data of the respective unit data, thereby performing the scrambling process. At this time, the palette exchange data producing section 4 produces palette exchange data under the predetermined conditions (Steps S6 and S7). The synthesizing section 5 synthesizes the unit data (Step S8). The compressing and encoding section 6 compresses and encodes the synthesized data (Step S9), and outputs the scrambled electronic image data (Step S10). Thus, a series of processing is ended.

Figure 7:
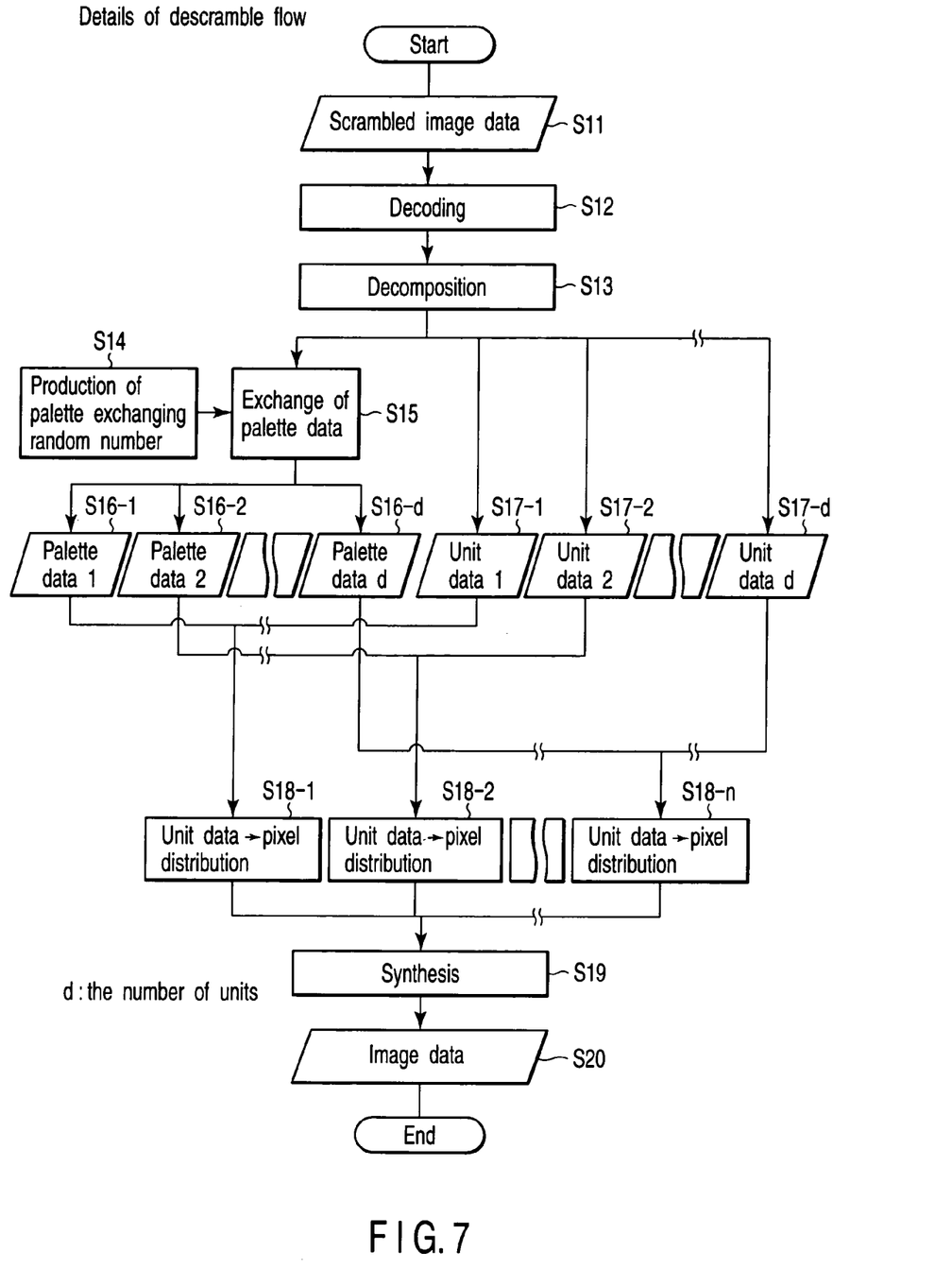
FIG. 7 is a flowchart for explaining details of the flow of the descrambling process according to the embodiment of the present invention.

The flow of the descrambling process of the image processing method according to the embodiment of the present invention will be described in detail with reference to the flowchart shown in FIG. 7.

In the following description, the configuration of the descrambling portion shown in FIG. 2 is referred to if necessary.

When the electronic image data, which has been scrambled by the scrambling portion, is input to the decoding section 7 (Step S11), the decoding section 7 decodes the compressed and encoded scrambled image data (Step S12). The decomposing section 8 decomposes the decoded image data into color decomposition data of the respective units (Step S13). The palette exchange section 9 exchanges the palette data of the respective units to the original state with reference to the palette exchange data produced by the palette exchange data producing section 10 (Steps S14 and S15). The palette exchange section 9 associates the unit data 1 with the palette data 1, the unit data 2 with the palette data 2, . . . and the unit data d with the palette data d (Step S16-1, S16-2, . . . , S16-$d$, S17-1, S17-2, . . . S17-$d$). The pixel value converting section 11 converts the pixel values of the color decomposition data of each unit (Step S18-1, S18-2, . . . , S18-$n$). The synthesizing section 12 synthesizes the color decomposition data of the respective units (Step S19), and outputs a piece of electronic image data (Step S20).

As described above, the image data is decomposed to the m pieces of decomposition data, and the palette data corresponding to the respective decomposition data are exchanged for each other. Therefore, the image scrambling process relating to the color information can be carried out by adding a simple structure. Thus, it is possible to provide a scramble image processing method, which can easily realize scramble image processing only by adding a simple structure and suppress the reduction in compression ratio to a relatively small degree.

The present invention is not limited to the embodiment described above, but can be improved or modified variously without departing from the gist of the invention. For example, the present invention can be implemented as a recording medium recording a computer program, an apparatus or system to realize the image processing method described above.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An image processing method for subjecting electronic image data to predetermined image processing, the method comprising:
    inputting electronic image data to be processed;
    decomposing the input electronic image data into n types of colors and producing m pieces of color decomposition data for each color, wherein both m and n are integers;
    producing palette data in which each of the m pieces of color decomposition data is assigned a palette identification number;
    producing palette exchange data for exchanging the palette data, wherein the palette exchange data is produced by performing a pseudo random number creating processing in which one of a common key, a public key and an arbitrary number input by a user is an initial value;
    exchanging palette identification numbers of the color decomposition data based on the produced palette exchange data; and
    synthesizing the m pieces of color decomposition data whose palette identification numbers are exchanged, encoding the synthesized data, and outputting the encoded data as a piece of scrambled image data.

2. The image processing method according to claim 1, wherein n is a fixed integer.

3. The image processing method according to claim 1, wherein n is an integer, which is changed in accordance with a total number of colors of the input electronic image data.

4. An image processing method for subjecting processed electronic image data, which has been subjected to predetermined image processing, to inverse image processing, the method comprising:
    inputting scrambled electronic image data;
    decoding the input electronic image data and producing m pieces of color decomposition data from the decoded electronic image data, wherein m is an integer;
    inputting palette exchange data for exchanging the palette data, wherein the palette exchange data is generated by performing a pseudo random number creating processing in which one of a common key, a public key and an arbitrary number input by a user is an initial value;
    exchanging palette data of the respective in pieces of color decomposition data based on the palette exchange data; and
    synthesizing the palette data-exchanged color decomposition data and outputting the synthesized data as a piece of electronic image data.

5. A computer-readable recording medium storing a computer program for executing an image processing method, the method comprising:
    inputting electronic image data to be scrambled;
    decomposing the input electronic image data into n colors and producing m pieces of color decomposition data for each color, wherein both m and n are integers;
    producing palette data in which each of the m pieces of color decomposition data is assigned a palette identification number;
    producing palette exchange data for exchanging the palette data wherein the palette exchange data is generated by performing a pseudo random number creating processing in which one of a common key, a public key and an arbitrary number input by a user is an initial value;
    exchanging palette identification numbers of the color decomposition data based on the produced palette exchange data; and
    synthesizing the m pieces of color decomposition data whose palette identification numbers are exchanged, encoding the synthesized data, and outputting the encoded data as a piece of scrambled image data.

6. The computer-readable recording medium according to claim 5, wherein n is a fixed integer.

7. The computer-readable recording medium according to claim 5, wherein n is an integer, which is changed in accordance with a total number of colors of the input electronic image data.

8. An image processing method comprising:
    inputting scrambled electronic image data;
    decoding the input electronic image data and producing m pieces of color decomposition data from the decoded electronic image data, wherein m is an integer;
    inputting palette exchange data for exchanging the palette data, wherein the palette exchange data is generated by performing a pseudo random number creating processing in which one of a common key, a public key and an arbitrary number input by a user is an initial value;
    exchanging palette data of the respective m pieces of color decomposition data based on the palette exchange data; and synthesizing the palette data-exchanged color decomposition data and outputting the synthesized data as a piece of electronic image data.

9. A computer-readable recording medium storing a computer program for executing an image processing method, the method comprising:

inputting scrambled electronic image data;

decoding the input electronic image data and producing m pieces of color decomposition data from the decoded electronic image data, wherein m is an integer;

inputting palette exchange data for exchanging the palette data, wherein the palette exchange data is generated by performing a pseudo random number creating processing in which one of a common key, a public key and an arbitrary number input by a user is an initial value;

exchanging palette data of the respective m pieces of color decomposition data based on the palette exchange data; and synthesizing the palette data-exchanged color decomposition data and outputting the synthesized data as a piece of electronic image data.

* * * * *